US005852675A

United States Patent [19]
Matsuo et al.

[11] Patent Number: 5,852,675
[45] Date of Patent: Dec. 22, 1998

[54] COLOR CHART FOR IMAGE CORRECTION AND METHOD OF COLOR CORRECTION

[75] Inventors: Kiyoshi Matsuo, 14-29, Sawamura 1-chome, Matsumoto, Nagano 390; Masaho Hayashi, Koganei; Atsushi Uchida, Tokyo, all of Japan

[73] Assignees: Kiyoshi Matsuo, Matsumoto; Dai Nippon Printing Co., Ltd., Tokyo, both of Japan

[21] Appl. No.: 632,065

[22] Filed: Apr. 15, 1996

[30] Foreign Application Priority Data

May 14, 1995 [JP] Japan .................................. 7-089098

[51] Int. Cl.$^6$ ........................................................ G03F 3/08
[52] U.S. Cl. ............................................................. 382/167
[58] Field of Search ............................ 364/526; 382/167, 382/128; 430/11; 358/523, 518, 455

[56] References Cited

U.S. PATENT DOCUMENTS

| | | | |
|---|---|---|---|
| 4,237,206 | 12/1980 | Fujita | 430/11 |
| 4,717,954 | 1/1988 | Fujita et al. | 358/523 |
| 4,908,295 | 3/1990 | Fuchizawa et al. | 430/272 |
| 5,130,935 | 7/1992 | Takiguchi | 364/526 |
| 5,309,256 | 5/1994 | Takada et al. | 358/504 |

*Primary Examiner*—Emanuel Todd Voeltz
*Assistant Examiner*—Matthew Smithers
*Attorney, Agent, or Firm*—Oliff & Berridge, PLC

[57] ABSTRACT

In order to correct for colors of images taken photographs of e.g., patient's skin in a clinical medicine, the method of the present invention comprises a color chart for image correction including a sheet base substrate, on the back surface of which an adhesive layer capable to adhere onto an object such as the patient's skin and color materials for example three colors R, G, B as three primary colors of lights applied on the surface to be captured in a color image with the object to correct for colors in an entire image according to basic colors indicated in the captured color regions.

15 Claims, 16 Drawing Sheets

COLOR CHART FOR IMAGE CORRECTION AND METHOD OF COLOR CORRECTION

DETAILED DESCRIPTION OF THE INVENTION

The present invention relates to a color chart for image correction and method of color correction for use at the time of recording color images of human skin and the like in the medical and esthetic fields.

PRIOR ART

In the medical and esthetic fields, human skin are often recorded as color image in photographic pictures or video.

For example, human face are often taken as photographs or video image for recording dermatological diseases in the dermatology, color of breaches in the plastic surgery, or for determining the therapeutic effect and the effect of making in esthetic.

PROBLEMS THAT THE INVENTION IS TO SOLVE

Pictures or video images may be taken for a same patient for many times along with the chronological progress. However, if there are difference between pictures in the quantity of daylight, the type of illuminating light source including daylight, the coloring of the photographic fields, and the manufacturer and the developer of the film, there may be arise problems in which the color becomes different between images even though the subject is the same.

Also, in case of the comparison with other clinical cases, the comparison may be further difficult since the color of patients may often be different.

Furthermore, the size of images may be inevitable of being different therebetween because a strictly identical shooting condition such as the distance and the magnitude could not be maintained for each time of taking pictures, there have been problems with the accurate and precise comparison and determination.

On the contrary, there may be the possibility that the color and the magnitude of the obtained images is corrected by digital image processing. However the correction is often subject to the operator because of indefinite reference, causing problems of inaccuracy in the relative comparison and the color evaluation.

The present invention has been made in view of the above conventional circumstances and has an object to provide a color chart for image correction to correct color of recorded images to the near color of real objects, so as to be able to perform accurate image processing when comparing a plurality of images taken individually in a same condition.

Another object of the present invention is to provide a method for correcting the color of recorded images by using said color chart for image correction.

MEANS OF SOLVING THE PROBLEMS

To achieve the above objects, the present invention comprises a color chart for image correction comprising a sheet base substrate such as paper and plastic film, the posterior side of which provides adhesive layer for adhering onto the object, the anterior surface of which is matted, and on the anterior surface of which at least three mat color materials are applied each in different partition.

Furthermore, the present invention comprises color materials of basic colors of at least one color system of RGB color, CMY color, and Lab color in the color materials.

The present invention also comprises color material of at least one color of white, gray, and black.

The present invention also comprises a scale characterized in that the partitions of applied color materials are divided into the same number of grids as the number of color materials and a series of squares of a standard size surround the grid on the surface of the base substrate.

The present invention is also characterized in that said base substrate is formed as a square, on the surface of the base an inscribed circle to the square is formed and which circle is divided into quadrants, such that one of inside zone of the quadrant and outside zone of the circle and four inside corners of the square is applied with one of fundamental colors of three primary colors of RGB color system, three primary colors of CMY color system, elementary colors of Lab color system is applied, and at least one of white, gray, and black color material is applied in the other zone.

Furthermore, the present invention is characterized in that the all of square regions on the surface of the base substrate is divided by grid and a part of the grid is superimposed on the quadrature lines of the circle.

The present invention is also characterized in that at least one of the quadrants in the circle on the surface of the base substrate is divided by grid and a part of grid is superimposed on the quadratures of the circle.

The present invention is also characterized in that one edge of the respective quadrature zones is in a standard length.

The present invention is also characterized in that it is comprised of material of the approximately same roughness and color as that of the surface of the object.

The present invention is also characterized in that it is comprised of material of the approximately same roughness and color as that of the human skin.

The method of the present invention comprises, to achieve above objects, the steps of:

recording images of a color chart for image correction along with the object, the color chart comprising a base substrate of sheet such as paper and plastic film, the posterior side of which provides adhesive layer for adhering onto the object, the anterior surface of which is matted, and on the anterior surface of which at least three color material are applied each in respective region in a form of mat, the color chart adhered to the object by means of the adhesive layer;

capturing the recorded images into a storage device as digital data;

displaying on a display screen the digital data stored in the storage device;

reading the color value of at least two colors of the three primary colors of the color chart for image correction on the display;

computing the correcting value for each of colors based on the digital data of the color value of the read color chart for image correction and the target values in the corresponding zone in the color chart for image correction;

correcting the digital data stored in the storage device with the computed correcting value to store again in the storage device.

The method of the present invention is characterized in that said three primary colors are white, black, and gray, target values of the color values for at least white and black of these colors are predetermined, and color values of respective white, black, and gray partitions on the image on the display are read so as to be able to compute the correcting value from the digital data of the read color values and the target value.

In addition, the method of the present invention is characterized in that said three primary colors are white, black, and gray, and the target value $O_H$, $O_L$, $O_M$ for these colors are predetermined so as to read in the displayed images on the screen, RGB values $I_H(R)$, $I_H(G)$, $I_H(B)$ of the white zone, RGB values $I_L(R)$, $I_L(G)$, $I_L(B)$ of the black zone, and RGB values $I_M(R)$, $I_M(G)$, $I_M(B)$ of the gray zone in order to compute the correcting value in accordance with the curve passing through the points (0, 0)–($I_L$, $O_L$)–($I_M$, $O_M$)–($I_H$, $O_H$)–(255, 255) on the two dimensional graph having coordinate axis of the read value and the corresponding target value.

Furthermore, the method of the present invention is characterized in that said three primary colors are white, black, and gray, and the target value OH, OL, OM for these colors are predetermined so as to read in the displayed images on the screen, RGB values $I_H(R)$, $I_H(G)$, $I_H(B)$ of the white zone, in order to convert each read RGB digital data in accordance with the curve passing through the points (0, 0)–($I_H$, $O_H$)–(255, 255) on the two dimensional graph having coordinate axis of the read value and the corresponding target value, then read in the displayed images on the screen, RGB values $I_L(R)$, $I_L(G)$, $I_L(B)$ of the black zone, in order to convert each of converted read RGB digital data in accordance with the curve passing through the points (0, 0)–($I_L$, $O_L$)–(255, 255) on the two dimensional graph having coordinate axis of the read value and the corresponding s target value, and next, read in the displayed images on the screen, RGB values $I_M(R)$, $I_M(G)$, $I_M(B)$ of the gray zone, in order to convert each of converted read RGB digital data in accordance with the curve passing through the points (0, 0)–($I_M$, $O_M$)–(255, 255) on the two dimensional graph having coordinate axis of the read value and the corresponding target value.

Also, the method of the present invention is characterized in that said three primary colors are white, black, and gray, and the target value OR, OL for white and black are predetermined, so as to read in the displayed images on the screen, RGB values $I_H(R)$, $I_H(G)$, $I_H(B)$ of the white zone, in order to convert each read RGB digital data in accordance with the curve passing through the points (0, 0)–($I_H$, $O_H$)–(255, 255) on the two dimensional graph having coordinate axis of the read value and the corresponding target value, then read in the displayed images on the screen, RGB values $I_L(R)$, $I_L(G)$, $I_L(B)$ of the black zone, in order to convert each of converted read RGB digital data in accordance with the curve passing through the points (0, 0)–($I_L$, $O_L$)–(255, 255) on the two dimensional graph having coordinate axis of the read value and the corresponding target value, and next, read in the displayed images on the screen, RGB values $I_M(R)$, $I_M(G)$, $I_M(B)$ of the gray zone, computing the mean value Ave ($I_M$) of the read values in order to convert each of converted read RGB digital data in accordance with the curve passing through the points (0, 0)–($I_M$, Ave($I_M$))–(255, 255) on the two dimensional graph having coordinate axis of the read value and the corresponding target value.

Furthermore, the method of the present invention is characterized in that said three primary colors are white, black, and gray, and the target value $O_H$, $O_L$, $O_M$ for these colors are predetermined so as to read in the displayed images on the screen, RGB values $I_H(R)$, $I_H(G)$, $I_H(B)$ of the white zone, in order to convert each read RGB digital data in accordance with the curve passing through the points (0, 0)–($I_H$, $O_H$)–(255, 255) on the two dimensional graph having coordinate axis of the read value and the corresponding target value, then read in the displayed images on the screen, RGB values $I_L(R)$, $I_L(G)$, $I_L(B)$ of the black zone, in order to convert each of converted read RGB digital data in accordance with the curve passing through the points (0, 0)–($I_L$, $O_L$)–(255, 255) on the two dimensional graph having coordinate axis of the read value and the corresponding target value, and next, read in the displayed images on the screen, RGB values $I_M(R)$, $I_M(G)$, $I_M(B)$ of the gray zone, computing $O'_M$ given by $$O'_M(R) = \Sigma I_M + (O_M(R)/\Sigma O_M)$$

$$O'_M(G) = \Sigma I_M + (O_M(G)/\Sigma O_M)$$

$$O'_M(B) = \Sigma I_M + (O_M(B)/\Sigma O_M)$$

where:

$$\Sigma I_M = I_M(R) + I_M(G) + I_M(B), \text{ and}$$

$$\Sigma O_M = O_M(R) + O_M(G) + O_M(B)$$

for converting each of the converted RGB digital data in accordance with the curve passing through the points (0, 0)–($I_M$, $O'_M$)–(255, 255) on the two dimensional graph having coordinate axis of the read value and the corresponding target value.

Also, the method of the present invention is characterized in that said three primary colors are white, black, and gray, and the target value $O_H$, $O_L$, $O_M$ for these colors are predetermined, so as to read in the displayed images on the screen, L* value $I_H(L)$, $I_L(L)$ of the white and black zone and L* a* b* value $I_M(L)$, $I_M(a)$, $I_M(b)$ of the image opened on the display, then convert stored L*data in accordance with the curve passing through the points (0, 0)–($I_L(L)$, $O_L(L)$)–($I_M(L)$, $O_M(L)$)–($I_H(L)$, $O_H(L)$)–(100, 100) on the two dimensional graph having coordinate axis of the read value and the corresponding target value, then computing the correcting values $\Delta M(a)$, $\Delta M(b)$ given by:

$$\Delta M(a) = O_M(a) - I_M(a)$$

$$\Delta M(b) = O_M(b) - I_M(b)$$

for adding said correcting values $\Delta M(a)$, $\Delta M(b)$ to the read a* and b* data to convert the converted digital data.

Furthermore, the method of the present invention comprises the steps of storing said correcting values, correcting digital image data to be subsequently captured by using said stored correcting values, storing these corrected digital image data.

In accordance with the present invention, a color chart for image correction is comprised of a sheet of base substrate capable of adhering onto the object such as human skin, the surface of the substrate is matted so as to reduce reflection of the light by applying in different region on that surface of the substrate at least three color materials, such that color correction will be accurately performed by using said three colors as standard after an object was taken as an image in order to be able to accurately compare color images recorded of different objects and color images recorded of a same object but in a different condition.

By combining three primary colors of the RGB color system, CMY color system, or Lab color system or the combination thereof, or the combination with at least one of white, gray, and black for the at least three color materials applied onto the different regions, RGB system may be used for output to an image such as on a television monitor, CMY for output to a printed matter, or Lab system which is more compatible with human vision may be used for the ease of color adjustment, or, further, white, gray, and black are used for adjusting color balance. Not only the color correction but also the accommodation to a variety of output form may be achieved provided that above all color are included.

By applying color materials onto square regions as well as arranging a series of a standard-sized squares around the regions to form a scale, the adjustment of not only the colors but also the size, inclination, skew, are correctly determined for the ease of correction.

By arranging square the surface of the base substrate to quadrature the inscribed circle to the square surface to appropriately apply color materials onto the quadrature circle and the four corners between the outer square and the inner quadrature circle for facilitating the color arrangement, the correction, and the comparison according to the condition such as the type of objects, and the forms of image output.

Furthermore, by partitioning as grids the surface of entire base substrate and superimposing a part of the grids onto the quadrature lines of the circle, the size and the skew are more accurately represented for the ease of correcting.

Additionally, by defining the length of an edge of each of the grid regions to a standard size, the size of the object may be instantly recognized by the viewer.

By arranging the surface of the base substrate with materials of approximately same convexo-concaved and colored one, the reflection of light and the condition of coloring at the surface of the object, the human skin for example, is to be accurately reported for more accurate subsequent image processing.

According to the present invention, in the color chart for image correction captured as an image, the color values of the color materials of at least two of three primary colors (all three colors in case of RGB and CMY system) in the corresponding zone in the color chart and on the display are compared to compute the correcting values for each of respective colors to be able to perform, with ease, the correction such that a value of a region for each colors in the image will become most appropriate as a whole.

As the colors of the color chart on the image to be read are white, black, and gray, and as these color values are simultaneously corrected, the most appropriate color value correction may be achieved, without any affection of the result of succeeding correction to the result of preceding correction. Also, the degradation of color tone due to over or under exposure at the time of shooting or fog may be easily corrected.

Also, the colors of the color chart on the image to be read are set to white, black, and gray and are read in this order to easily correct the degradation of color tone due to over or under exposure at the time of shooting or fog. When the colors are read and corrected in the order of white, black, and gray, the best results may be obtained.

WORKING EXAMPLES

The working examples of the present invention will be now described hereinbelow to accompanying drawings.

Figure 1:
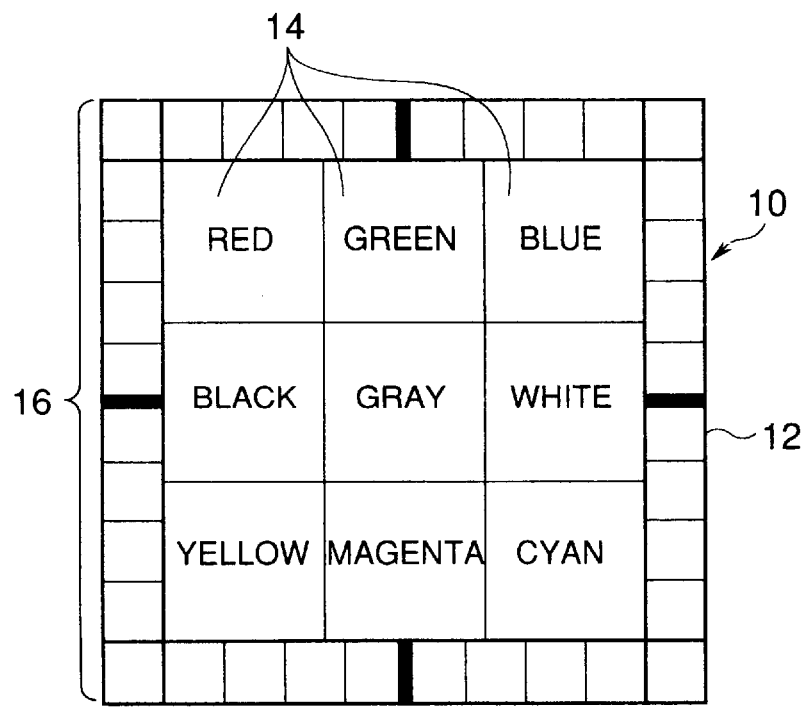
FIG. 1 An enlarged color chart for image correction in accordance with a first embodiment of the present invention.

Referring to FIG. 1, a color chart for image correction 10 is composed of a sheet base substrate 12 such as paper or plastic film, the form of the surface of which is square, and on which there are nine color partition 14 of square grid and a scale 16 composed of a series of smaller squares of a standard size than the s color partition 14 therearound.

The nine color partitions 14 are applied with the color materials of three primary colors of light, R, G, B, and black, white, and gray, as well as three primary colors of materials, Y, M, C, from left hand top to right hand bottom in FIG. 1.

The surface of the sheet base substrate 12 is matted and the finish of painted (printed) color materials are mat so as to diffuse reflecting light.

Figure 2:
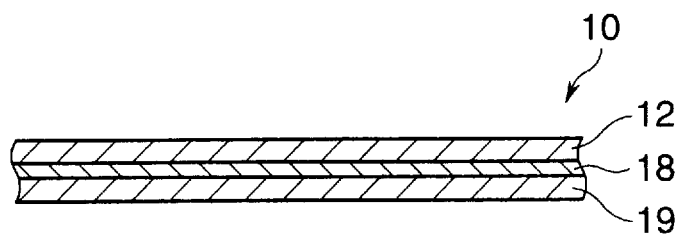
FIG. 2 An enlarged sectional view of the cross-section of the color chart for image correction according to the present invention.

The posterior side of the sheet base substrate 12 has an adhesive layer 18 to be able to attach onto a object such as human skin, for example adhered on a peeler base 19 to use by peeling it off, as shown in the FIG. 2.

Photograph or video recording will be made by attaching the a color chart for image correction 10 with the adhesive layer 18 onto the face of a patient 20 and retaining it on the skin.

The color of the image recorded (taken) onto a film or a magnetic data storage device may vary in accordance with conditions such as illumination, film, camera, etc. However in the recorded image there are the color of the color chart for image correction 10 captured. By correcting with an image processing device (a computer) so as to restore respective colors in the color partitions 14 to the original colors, the color of the skin of patient 20 will be accurately corrected.

In the color partitions 14, as three primary colors R, G, B, of the light, three primary colors C, M, Y, of materials, and white, gray, black for color balance correction are applied, the colors may be accurately corrected in accordance with the form of output of the color image.

Also as a scale 16 is captured in the color image, thus the size of color images recorded in a plurality of different conditions may be equally adjusted, based on the size of the scale 16. Furthermore, both the color partitions 14 and scale 16 are formed square, so that the inclination and skew of the recorded object may be accurately determined.

Practical protocol for obtaining digital signal to be image processed will be as follows:

If the image is photographed by a steel camera, then the image on a film or print is scanned by a color scanner to convert to digital data. If the image is recorded by a digital camera, the signal is directly image processed. If the image is captured by a video camera, then the steel image is A/D converted to digital signal, which in turn is processed with an image processing device for correction as described below.

Figure 3:
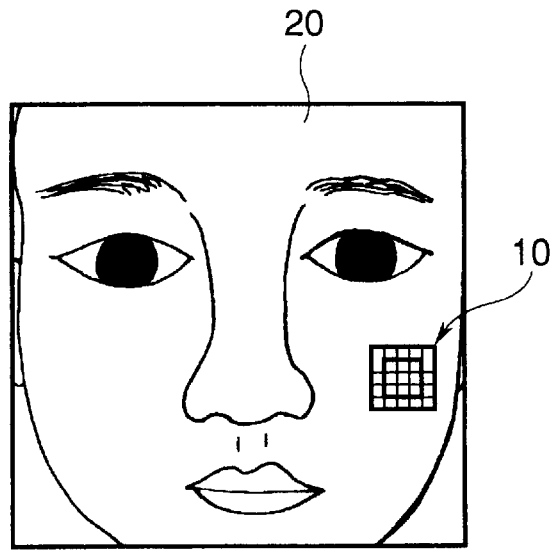
FIG. 3 A color chart adhered onto the face of a patient.

A plurality of sizes, such as that having 5 cm, 2 cm, 1 cm, and 5 mm edge length, of color chart for image correction 10 are provided to conform to the size of object. For example, if a patient's face is recorded as shown in FIG. 3, then a color chart for image correction 10 of edge length of 1 cm square is used.

At the time of recording, the surface area of the color chart for image correction 10 is selected so as not to occupy too large area relative to the entire area of the obtained color image, as well as not to occupy too small area in order to obtain sufficient color information when image processing, for example selected to become 1/50 to 1/100 of the color image area.

Figure 4:
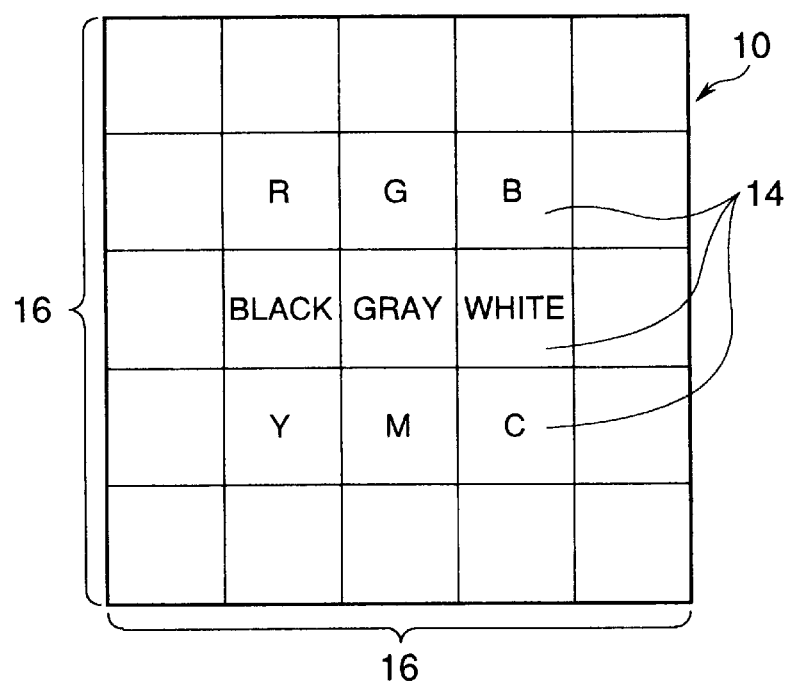
FIG. 4 A top plain view of a modified embodiment of the color chart for image correction according to the present invention.

In case of the color chart for image correction of edge length 5 mm, the grids of the scale 16 may not be recognized on the color image. Therefore it is necessary to construct it at the size identical to that of color partitions 14, as shown in FIG. 4.

The embodiment shown in FIG. 1 is made on the sheet base substrate 12, by partitioning the surface thereof by square grids to create color partitions 14, then forming scale 16 therearound. The present invention is not intended to be limited to the above embodiment. It may be sufficient to have at least three different color materials applied on respective different regions on the surface of the sheet base. Also, the color materials are not limited to that of either RGB system or CMY system, the fundamental colors of Lab color system (hereinafter, the term fundamental color comprises both the three primary colors of RGB color system and CMY color system) may be used instead. Thus the present invention may be embodied as in a variety of modes as described below.

Figure 5:
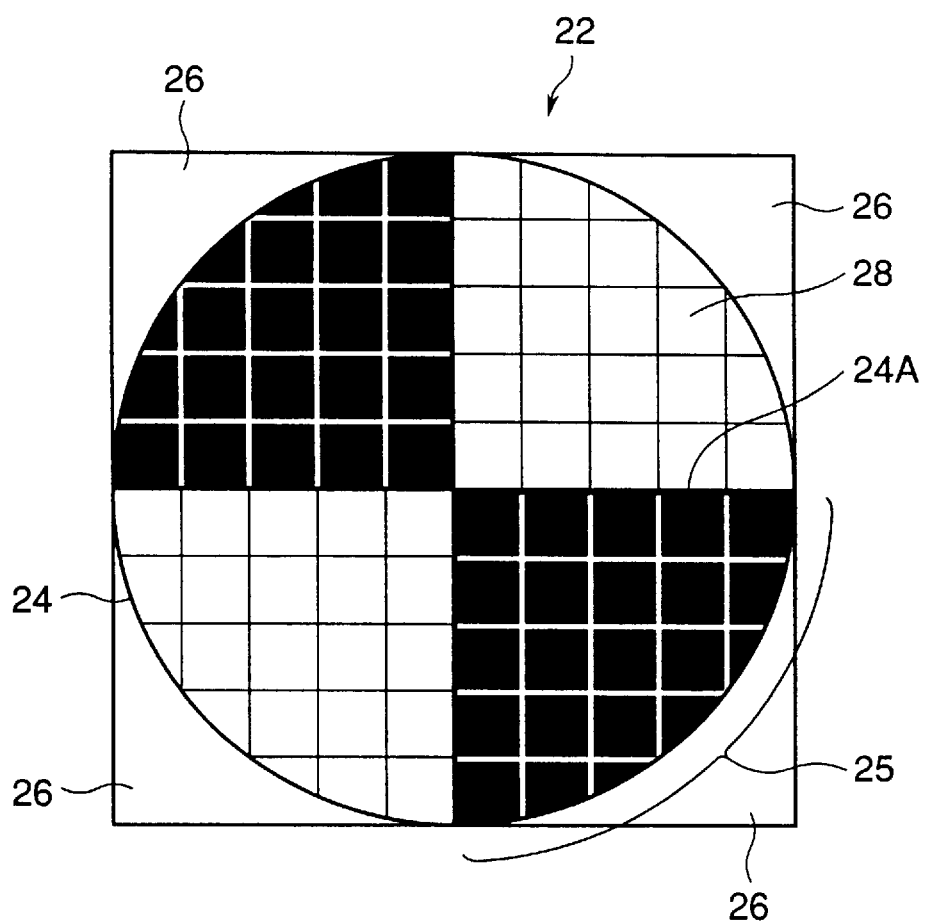
FIG. 5 An enlarged top plain view of the color chart for image correction according to a second embodiment of the present invention.

The image chart for image correction 22 in accordance with the second embodiment of the present invention as shown in FIG. 5 comprises the surface of the square form, in which color partitions 26 are provided for displaying three or four fundamental colors of RGB color system, CMY color system, or Lab color system at the four corner zones between the inscribed circle 24 and the remaining squares outside the circle, the inscribed circle 24 is divided into quadratures to form the quadrature line 24A superimposed on the square grids 28, and then two opposite of quadrature circle 25 are applied with black.

When three fundamental colors of RGB color system are applied to the color partitions 26, remaining one corner may be painted with gray. The square grids 28 lines in a pair of the black quadrature circle 25 are not painted.

Figure 6:
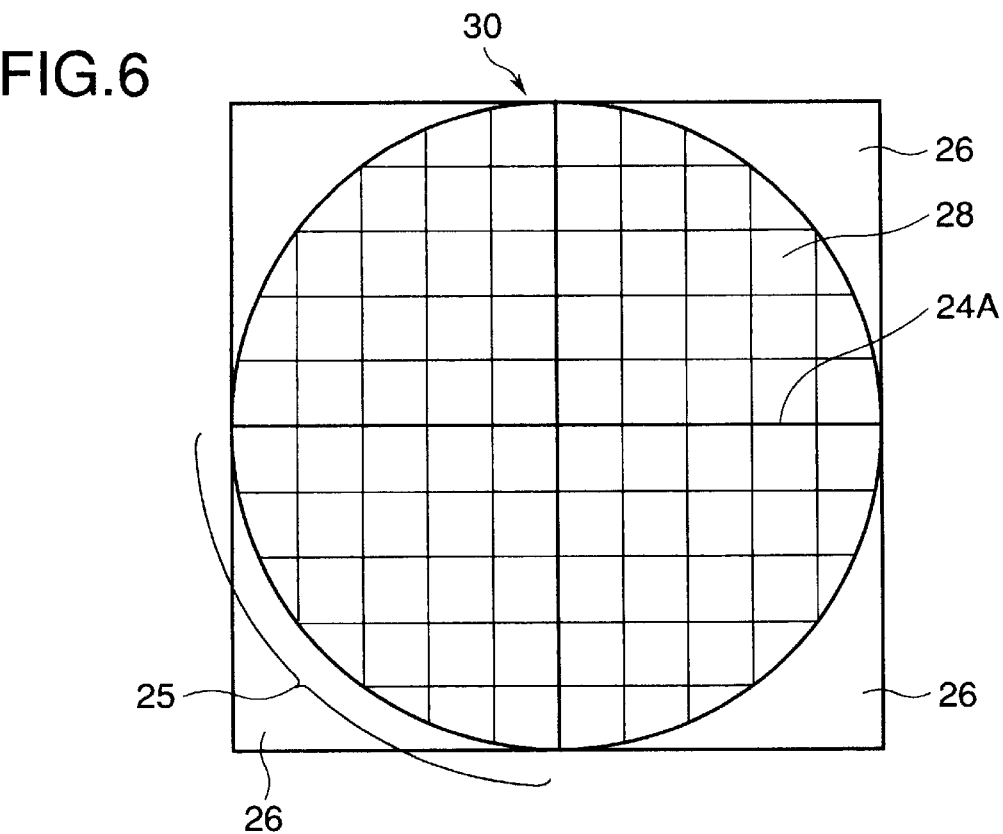
FIG. 6 An enlarged top plain view of the color chart for image correction according to a third embodiment of the present invention.

The quadrant in the inscribed circle 24 may or may not be painted black, as shown in the color chart for image correction 30 of the third embodiment of FIG. 6.

Figure 7:
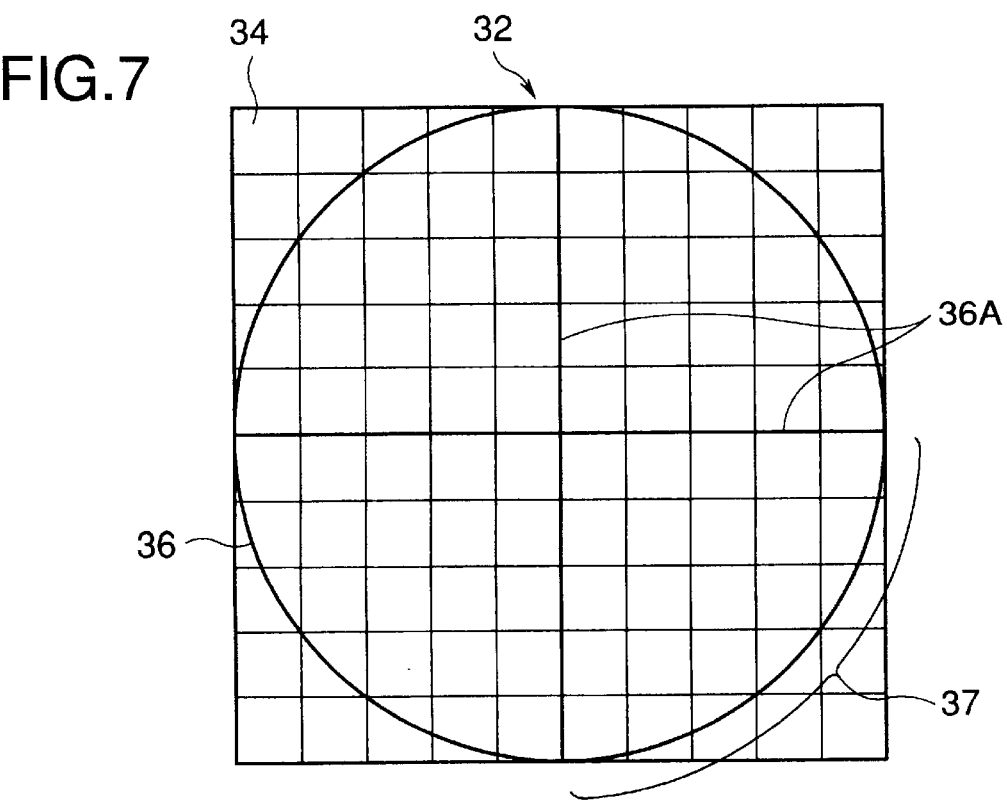
FIG. 7 An enlarged top plain view of the color chart for image correction according to a fourth embodiment of the present invention.

Furthermore, FIG. 7 shows the color chart for image correction according to the fourth embodiment of the present invention.

The color chart for image correction 32 is partitioned by the square grids 34 in the entire surface area in the form of square, in which an inscribed circle 36 inscribing to the square is formed, as well as the inscribed circle 36 is divided into quadratures by the quadrature line 36A superimposed on the square grids 34, then four color materials of three fundamental colors from the color system of either RGB, CMY or Lab color system plus another one color are respectively applied to the quadrant circle 37, and the four corners between the inscribed circle 36 and the square are applied with appropriately white, gray, and black.

Figure 8A:
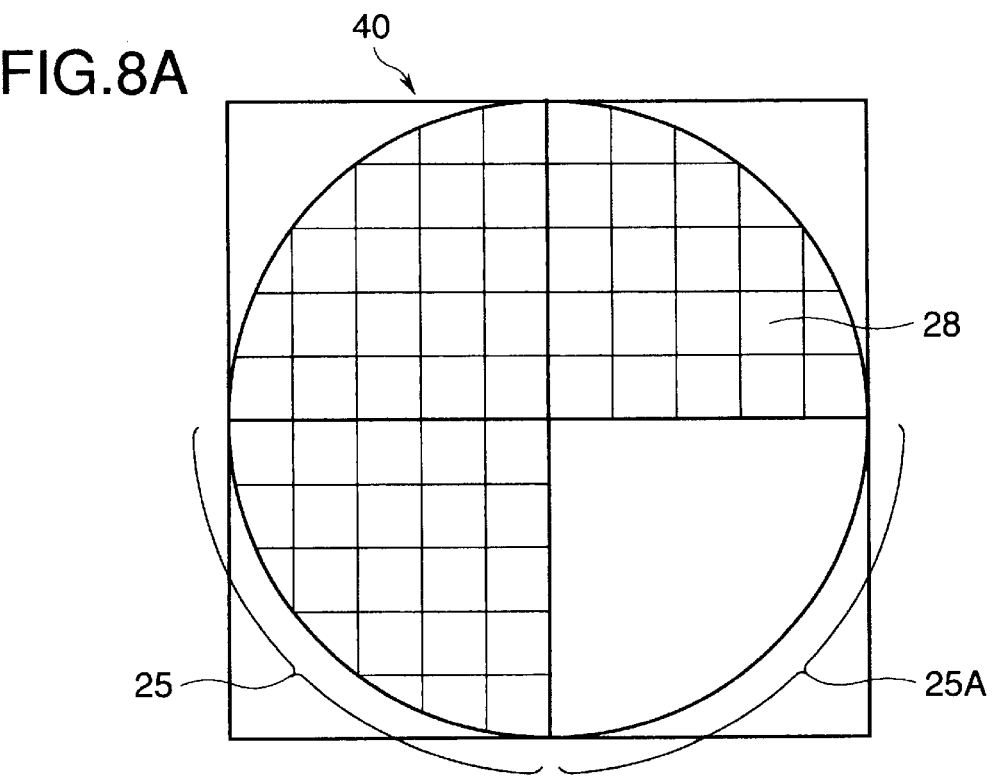
FIGS. 8A and 8B An enlarged top plain view of the color chart for image correction according to a fifth embodiment of the present invention.
Figure 8B:
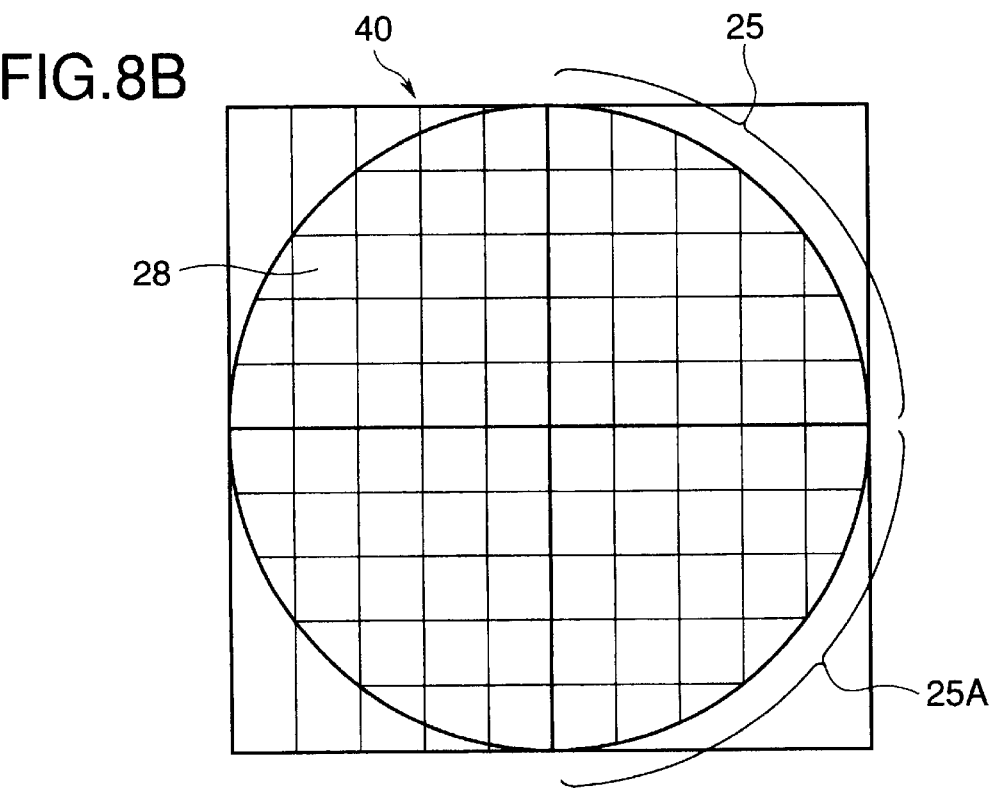

The color chart for image correction 40 according to the fifth embodiment of the present invention as shown in FIGS. 8A and 8B is applied with color materials of most important colors for the color correction by using an image processing device to one circle 25A of quadrature circle 25 according to the embodiment as shown in FIG. 6. In this case, the grids within the quadrature circle 25 may be omitted as shown in FIG. 8A, or grids 28 may be formed in the quadrature circle 25 as shown in FIG. 8B.

Figure 9:
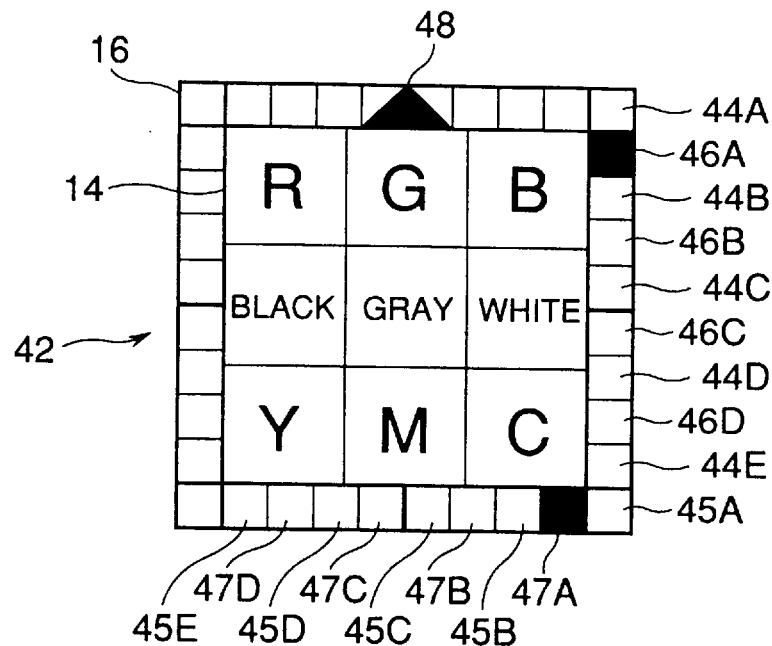
FIG. 9 An enlarged top plain view of the color chart for image correction according to a sixth embodiment of the present invention.

FIG. 9 shows a color chart for image correction 42 according to the sixth embodiment of the present invention.

The color chart for image correction 42 in FIG. 9 is comprised of unfilled grids 44A–44E for each two grids from the top at the right hand vertical column and information grids 46A–46D either filled or unfilled according to the version number which is one of color chart management information item, between respective unfilled grids 44A–44E, in the scale 16 similar to FIG. 1.

In the scale 16 in FIG. 9, at the bottom horizontal row are composed of unfilled square grids 45A–45E and information grids 47A–47D either filled or unfilled according to the lot number which is one of color chart management information item, between each unfilled grids 45A–45E.

In the scale 16 in FIG. 9, two center grids at the top horizontal row are half-filled, and formed with adhesion direction arrow 48 in the form of upper arrow.

The information grids 46A–46D and 47A–47D displays its version number and lot number in the form of binary digits.

Figure 10:
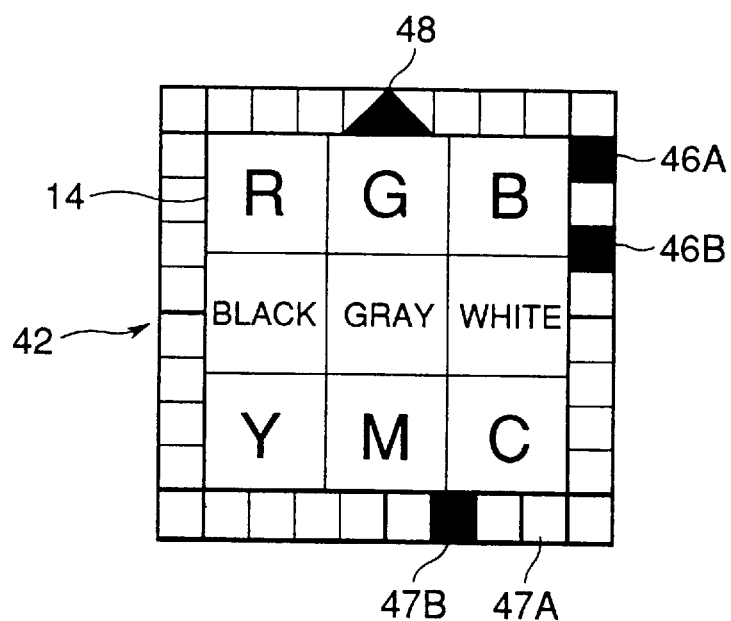
FIG. 10 An enlarged top plain view of the color chart for image correction according to a seventh embodiment of the present invention.
Figure 11:
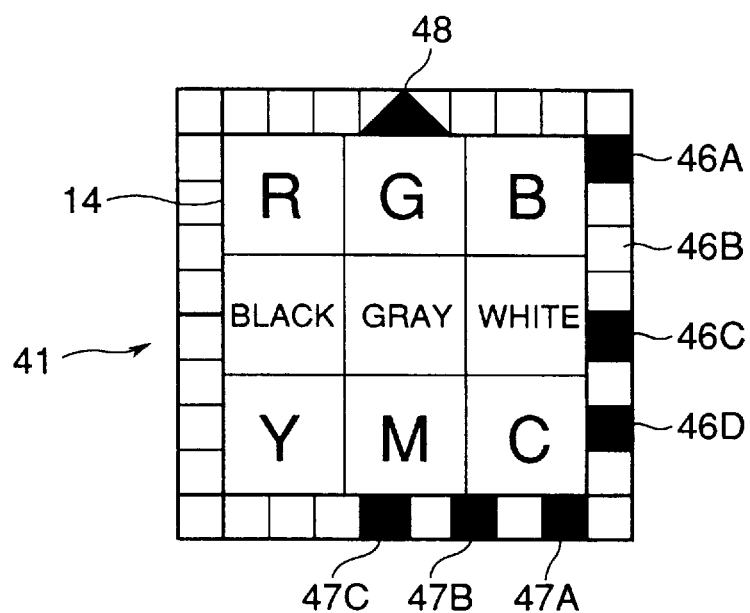
FIG. 11 An enlarged top plain view of the color chart for image correction according to a eighth embodiment of the present invention.

For example, as shown in FIG. 9, the chart is version 1 if only the topmost information grid 46A is filled in the vertical column, or as shown in FIG. 10, the chart is version 3 if the two topmost information grids 46A and 46B are filled, and as shown in FIG. 11, the chart is version 13 if the topmost, third, and forth information grids 46A, 46C, 46D are filled.

In the bottom horizontal row, for example, as shown in FIG. 9, lot number 1 will be displayed if only the first information grid 47A is filled; lot number 2 will be displayed if only the second information grid 47B is filled; lot number 7 will be displayed if, as shown in FIG. 11, the first, second, and third information grids are filled.

The color values for respective colors in the color partition 14 in the color chart for image correction 42 is predetermined for each version and lot number and stored either in the computer memory or on a hard copy paper as a table. By reading or instructing a version and lot number color values may be preset and/or displayed. Additionally, a table defining each of color values for respective lot number may be provided so as to input manually color values defined in the table into a computer.

As above mentioned, the above embodiment is a sheet base substrate such as paper and plastic film in which the surface is matted and mat color materials such as three fundamental colors are applied since it is intended to prevent the development of ambiguous image, for example stripping effect due to the reflection of the illumination light such as flash lamp. Ideally the chart has a surface conforming to the characteristics of the roughness of the surface of object and of the color.

Accordingly, for example, when using the color chart for image correction according to the present invention to adhere onto human skin, the surface of the base substrate of the color chart for image correction should have characteristics approximately conforming to the roughness and the color of the human skin.

The roughness of the human skin may be selected appropriately according to the object such as new-borns, children, adults, seniors, elders, males, females, oily skin, or dry skin. The color may be selected according to human species such as white, yellow, black, or miscegenation thereof.

Now an example of the method for correcting color of an image by using the color chart for image correction as described above will be described.

Figure 12:
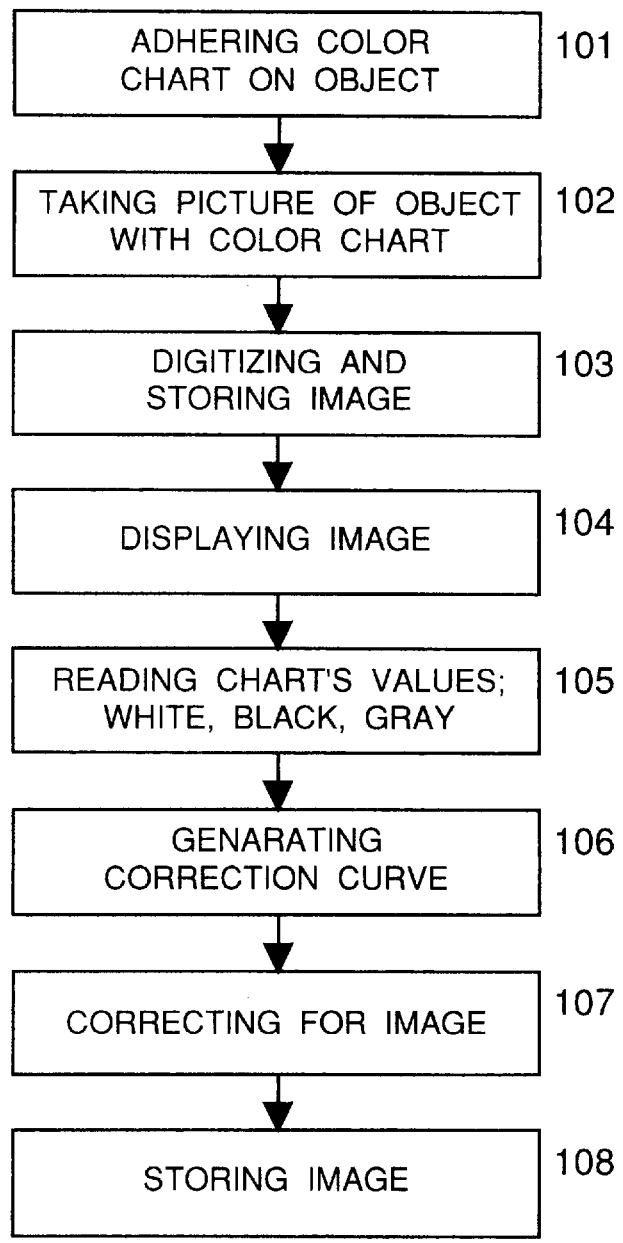
FIG. 12 A flow chart of the sequence for correcting images using the color chart for image correction according to the method of the present invention.
Figure 13:
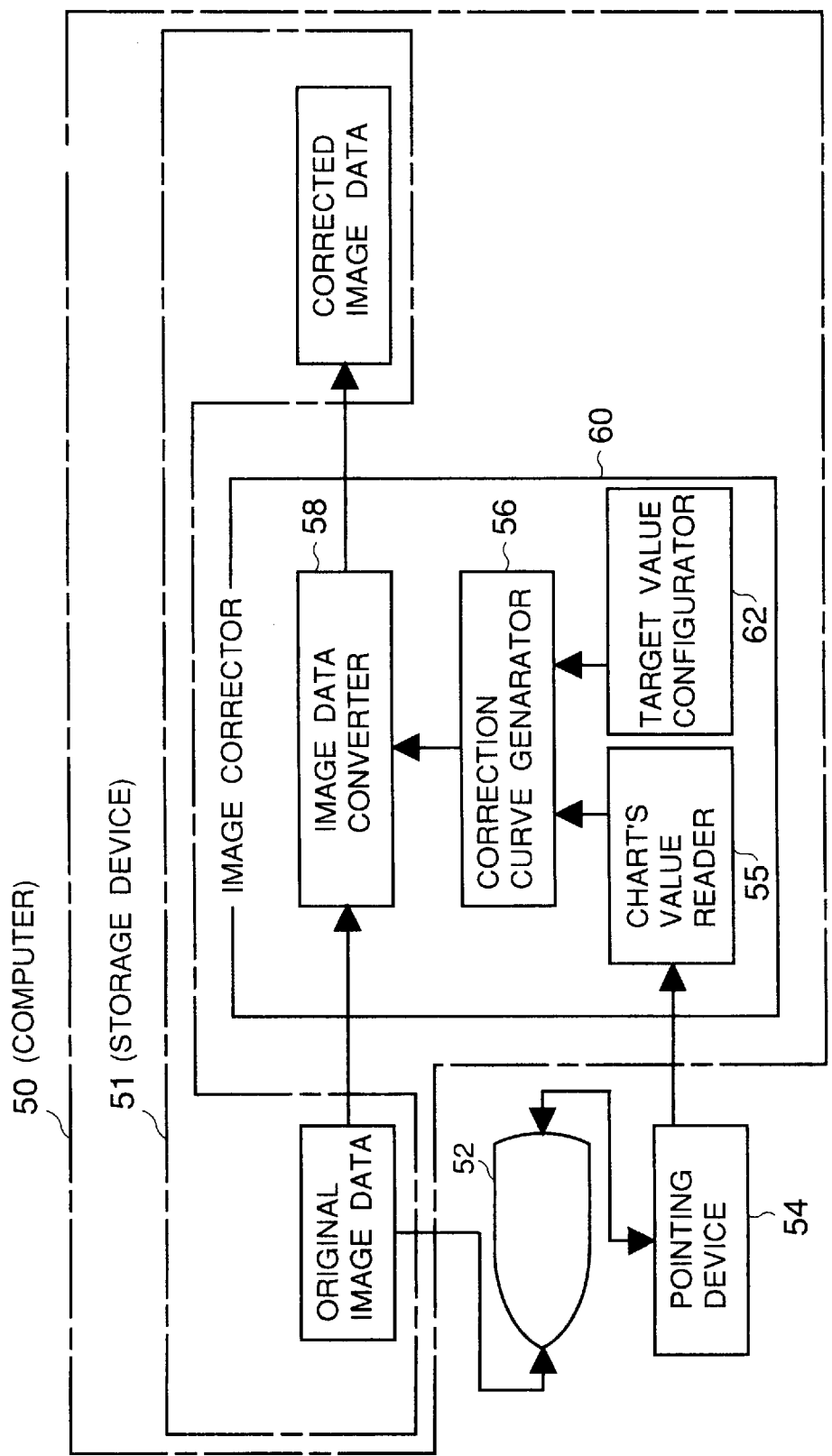
FIG. 13 A block diagram of the system for carrying out the method of color correction.

The method is a method for color correction by using a color chart, which consists of the steps as shown in FIG. 12 of: adhering the color chart for image correction as above onto an object, a patient 20, with the adhesive layer 18 and recording an image; capturing the recorded image into the storage device 51 in a computer 50 shown in FIG. 13 as digital data; displaying on a display 52 digital data stored in the storage device 51; capturing color values in the color chart on the display 52 of at least two of the three colors into chart value reader 55, by instructing for example with a pointing device 54, computing in for example correction curve generator 56 the correcting values for each of colors by comparing the digital data of the color values of the color chart captured, with the (predetermined) target values or the preset values for the corresponding regions in the color chart for image correction; correcting in image data converter 58 the digital data captured in the storage device 51 by means of the computed correcting values to store again in the storage device 51. The reference numeral 60 designates to the entire image corrector, and 62 to target value configurator. The target value or preset values are configured to be set automatically in the target value configurator 62 based on the pre-installed table by reading or inputting the version number or the lot number similar to the color chart for image correction shown in FIG. 9 to FIG. 11. As stated above, the target values may be configured to be manually set by inputting the values written in a table into the target value configurator 62.

Practically, as shown in FIG. 12, the method comprising: adhering the color chart for image correction onto a patient 20, the object, in the step 101; photographing the object with the color chart in step 102; digitizing the taken image to store in the step 103; displaying the stored image onto the display 52 in the step 104; reading the color values in respective white, black, and gray regions on the color chart image displayed on the display 52 by using a scanner 54 in the step 105.

Figure 14:
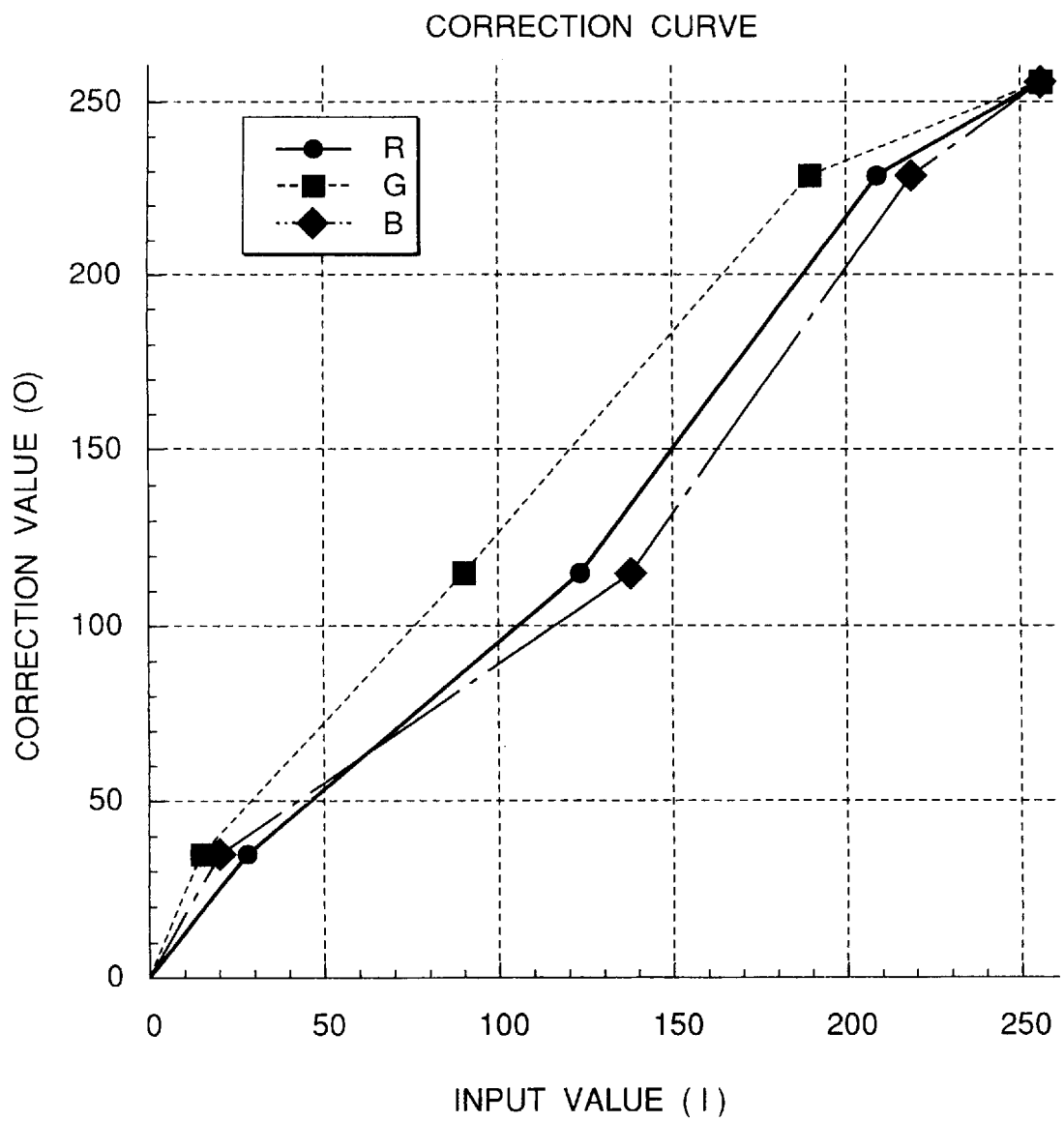
FIG. 14 A graph of the RGB correction curve created by the color correcting algorithm shown in the flow chart of FIG. 12.

Then in the correction curve generator 56, as shown in FIG. 14, a correction curve is generated on a bi-dimensional graph with correction values as vertical s axis and read values as horizontal axis, based on the read digital data and the digital data of the preselected target values for the white, black, and gray regions in the color chart for image correction (see step 106), then the captured digital data is corrected for according to the correction curve (see step 107), the corrected digital data is stored in the step 108.

More specifically, as shown in FIG. 13, the target values $O_H$, $O_L$, $O_M$ for respectively white, black, and gray are set in the correction curve generator 56 by the target value configurator 62, then after an image is opened on the display 52 the RGB values $I_H(R)$, $I_H(G)$, $I_H(B)$, $I_L(R)$, $I_L(G)$, $I_L(B)$, $I_M(R)$, $I_M(G)$, $I_M(B)$ for the white, black, and gray region respectively in the image, are read out. A correction curve passing through the points (0, 0), ($I_L$, $O_L$), ($I_M$, $O_M$), ($I_H$, $O_H$), (255, 255) on the bi-dimension graph is generated for converting respective RGB digital data already captured to store in the storage device 51 the digital data. For example, if the RGB values (input values) of the color chart for image correction are white: $I_H(R)$=208, $I_H(G)$=188, $I_H(B)$=217, black: $I_L(R)$=29, $I_L(G)$=16, $I_L(B)$=19, gray: $I_M(R)$=126, $I_M(G)$=90, $I_M(B)$=138, and the target RGB values (target values) are white: $O_H(R)=O_H(G)=O_H(B)$=228, black: $O_L(R)=O_L(G)=O_L(B)$=35, gray: $O_M(R)=O_M(G)=O_M(B)$=114, then, the correction curve will be (see FIG. 14):

R data: (0,0)–(29,35)–(126,114)–(208,228)–(255,255),

G data: (0,0)–(16,35)–(90,114)–(188,228)–(255,255),

B data: (0,0)–(19,35)–(138,114)–(217, 228)–(255, 255).

Now the embodiment of the method for correction shown in the flow chart 1 of the FIG. 12 is defined as correction algorithm 1, the correction algorithm 1 simultaneously corrects and converts the read digital data for respective white, black, and gray color regions. This algorithm is ideal because it does not have the problem that can be seen when white, black, gray are sequentially corrected that the preceding correction is affected by the succeeding correction.

In case in which the correction method as the algorithm 1 may be difficult to perform due to the architecture of computer or the specification of software, the following algorithms 2 to 4 may be used instead.

Figure 15:
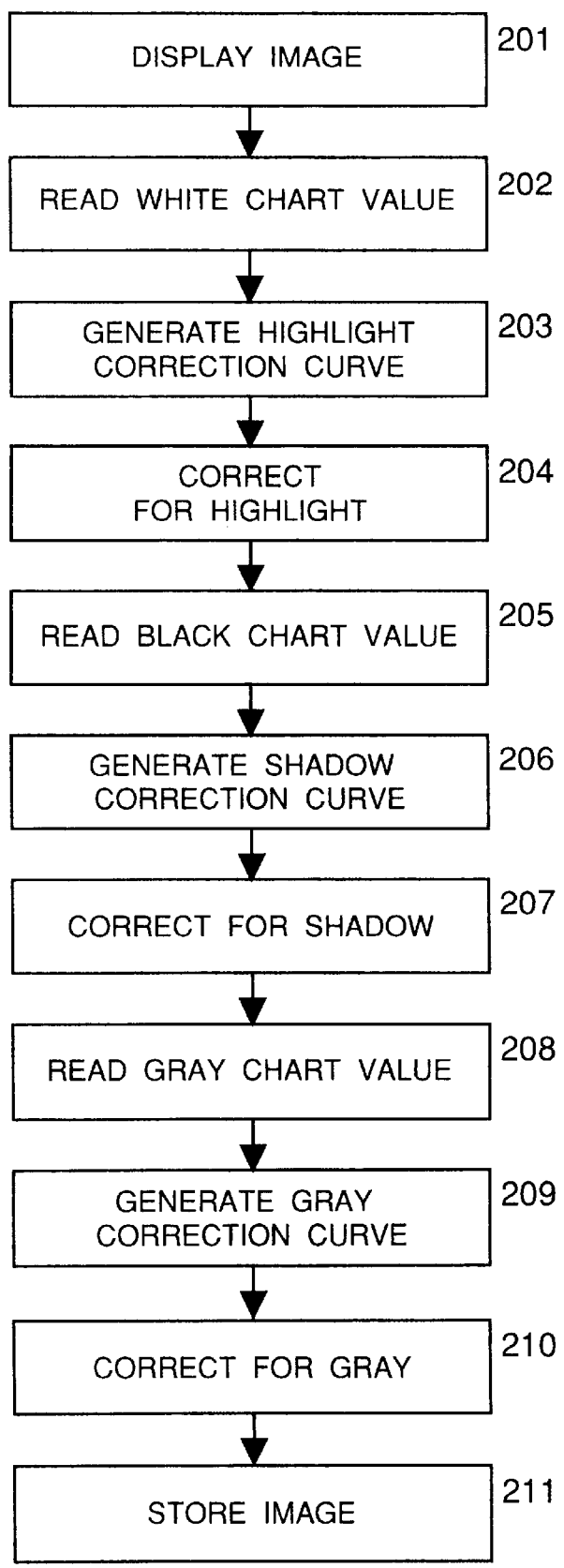
FIG. 15 A flow chart of another correcting algorithm of the method of color correction according to the present invention.

The algorithms 2 to 4 are for correcting digital data captured according to the protocol defined in the flow chart shown in FIG. 15.

Referring now to FIG. 15 the algorithm 2 will be described below.

Figure 16:
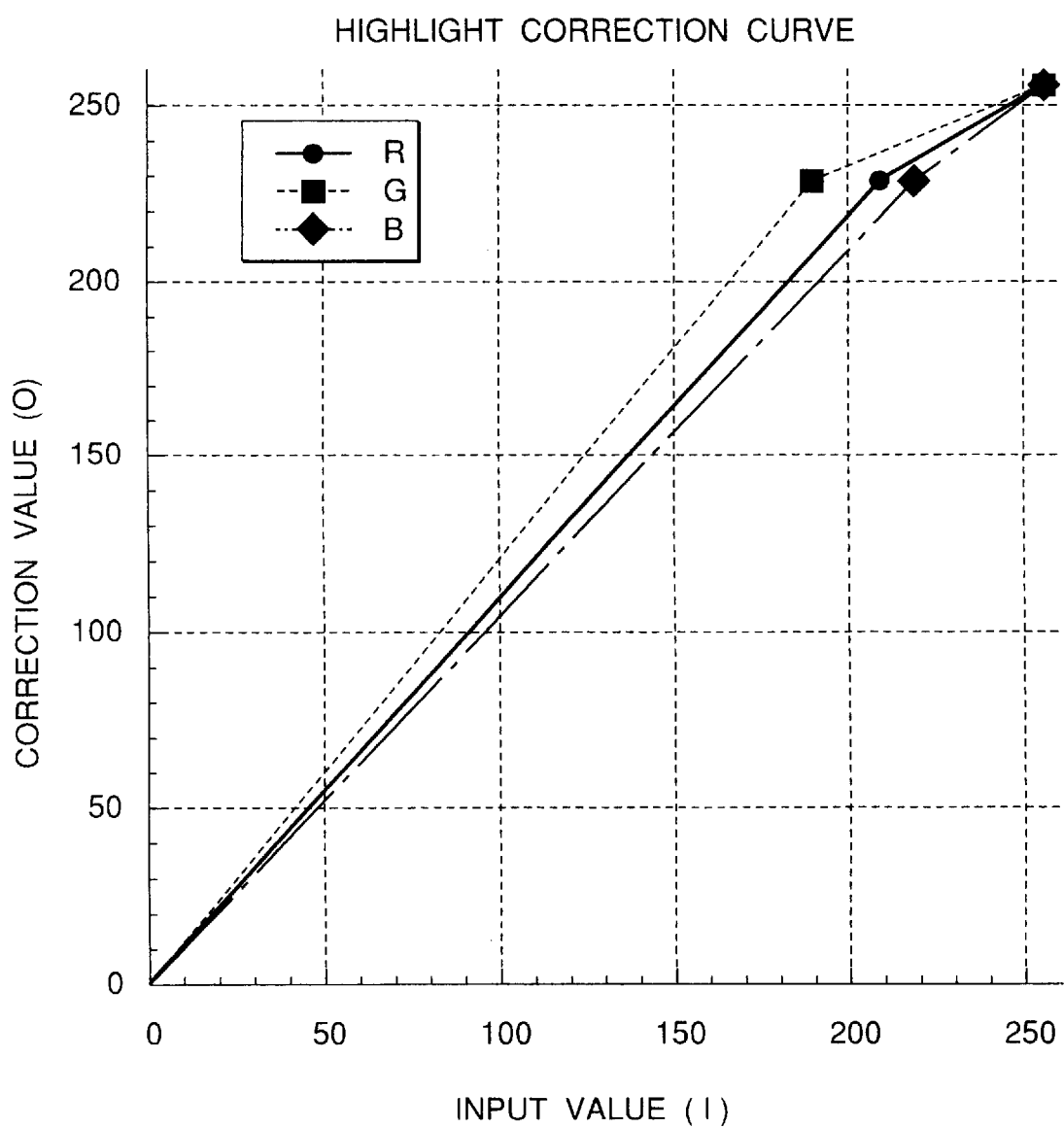
FIG. 16 A graph of the highlight correction curve created by the algorithm shown in the flow chart of FIG. 15.

The target values for white, black, gray, $O_H$, $O_L$, $O_M$ are preset. In the step 201 the image is displayed, in the step 202 the RGB values for white region in the image $I_H(R)$, $I_H(G)$, $I_H(B)$ are read, in the step 203 a highlight correction curve passing through the correction algorithm (0, 0), ($I_H$, $O_H$), (255, 255) is generated (see FIG. 16), then in the step 204 by using this highlight correction curve respective RGB data are converted so as to correct highlight, in the step 205 the RGB values for black region in the image $I_L(R)$, $I_L(G)$, $I_L(B)$ are read, in the step 206 a shadow correction curve passing through (0, 0), ($I_L$, $O_L$), (255, 255) is generated, then in the step 207 by using this shadow correction curve respective RGB data are converted so as to correct shadow.

Next, the RGB values of gray regions in the image $I_M(R)$, $I_M(G)$, $I_M(B)$ are read, in the step 209 a gray correction curve passing through (0, 0), ($I_M$, $O_M$), (255, 255) is generated, then RGB data are respectively converted so as to correct gray based on the curve and in the step 211 the image (digital data) is stored.

Figure 17:
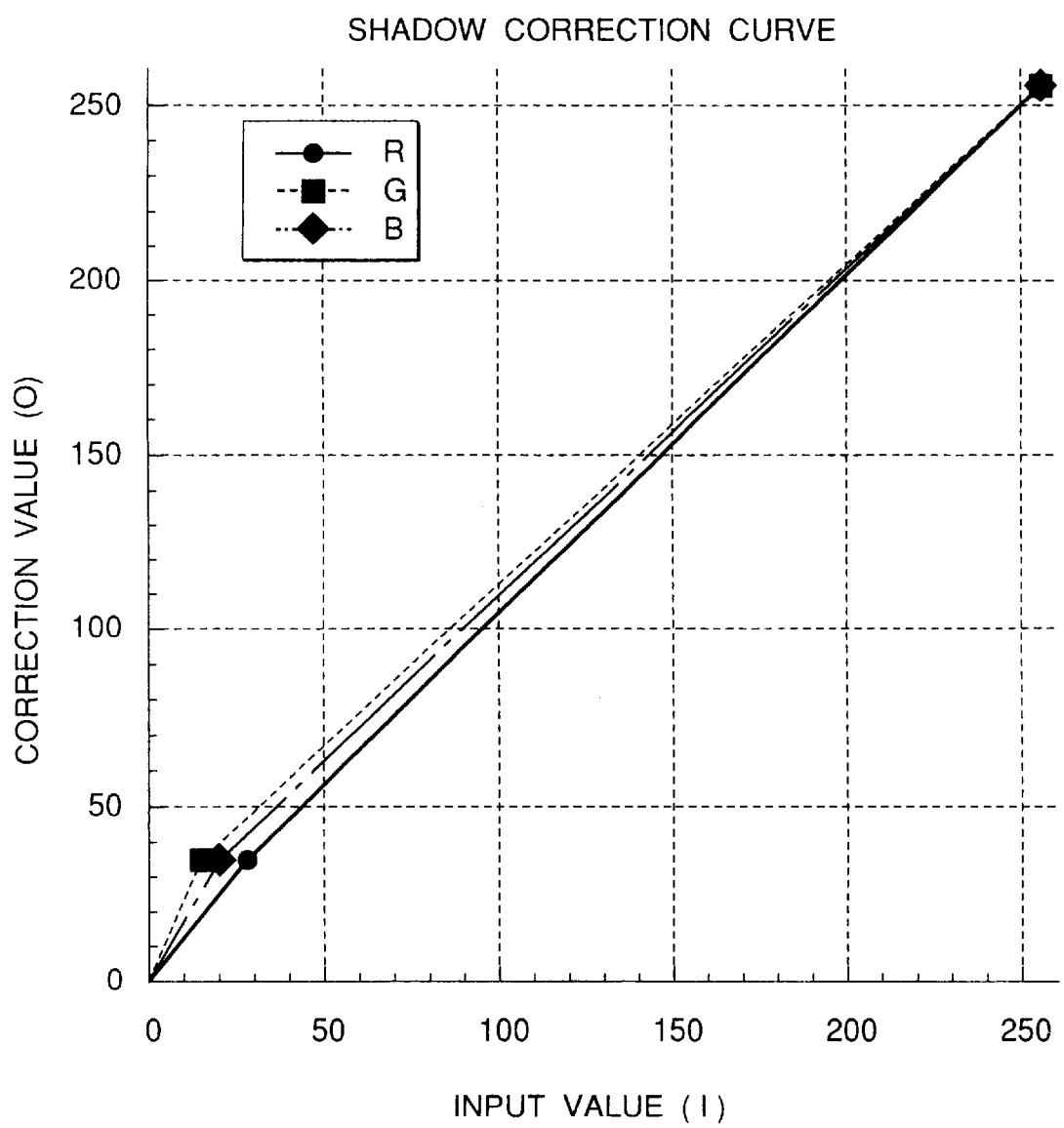
FIG. 17 A graph of the shadow correction curve.
Figure 18:
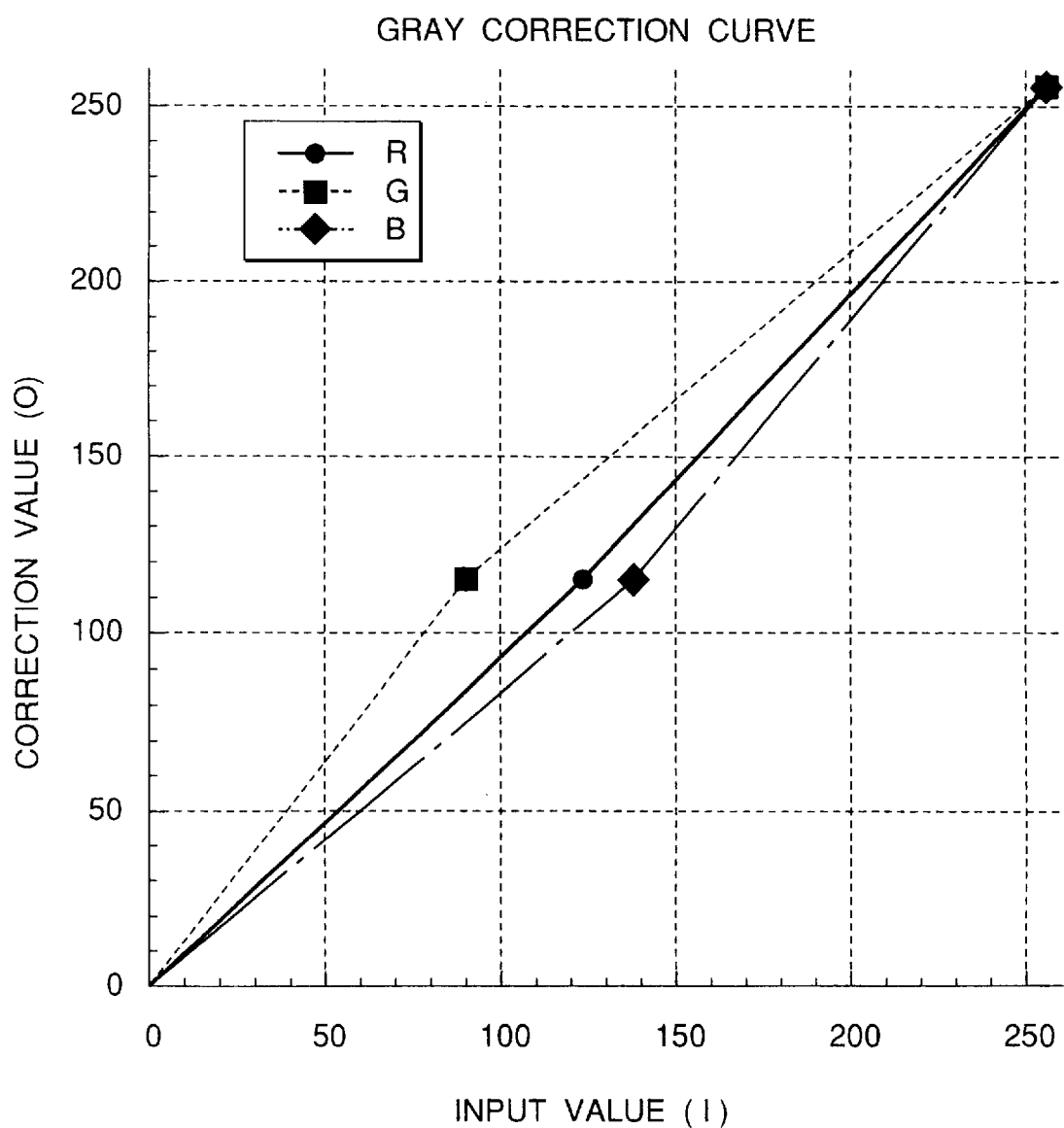
FIG. 18 A graph of the gray correction curve.

For example, the RGB values in the chart (input values) are:

white: $I_H(R)$=208, $I_H(G)$=188, $I_H(B)$=217, black: $I_L(R)$=29, $I_L(G)$=16, $I_L(B)$=19, gray: $I_M(R)$=126, $I_M(G)$=90, $I_M(B)$=138, and the target RGB values (target values) are white: $O_H(R)$=$O_H(G)$=$O_H(B)$=228, black: $O_L(R)$=$O_L(G)$=$O_L(B)$=35, gray : $O_M(R)$=$O_M(G)$=$O_M(B)$=114, then, the correction curve will be (see FIGS. 16 to 18):

for highlight curve:

R data: (0,0)–(208,228)–(255, 255)

G data: (0,0)–(288,228)–(255, 255)

B data: (0,0)–(217,228)–(255, 255)

for shadow curve:

R data: (0,0)–(29,35)–(255,255)

G data: (0,0)–(16,35)–(255,255)

B data: (0,0)–(19,35)–(255,255)

for gray curve:

R data: (0,0)–(126,114)–(255,255)

G data: (0,0)–(90,114)–(255,255)

B data: (0,0)–(138,114)–(255,255).

The correction algorithm 3 is different from the correction algorithm 2 in the steps 209 and 210. The step 209 in the correction algorithm 3 consists of computing the mean values Ave($I_M$) for read gray region RGB values $I_M(R)$, $I_M(G)$, $I_M(B)$ for generating gray correction curve passing through (0, 0), ($I_M$, Ave($I_M$)), (255, 255). In the step 210 the RGB digital data are respectively converted based on this correction curve, and in the step 211 the digital data of the converted image is stored.

For example, the RGB values in the chart (input values) are:

white: $I_H(R)$=208, $I_H(G)$=188, $I_H(B)$=217, black: $I_L(R)$=29, $I_L(G)$=16, $I_L(B)$=19, gray : $I_M(R)$=126, $I_M(G)$=90, $I_M(B)$=138, and the target RGB values (target values) are white: $O_H(R)$=$O_H(G)$=$O_H(B)$=228, black: $O_L(R)$=$O_L(G)$=$O_L(B)$=35, then, the correction curve will be (see FIGS. 16 to 18): for highlight curve:

R data: (0,0)–(208,228)–(255,255)

G data: (0,0)–(188,228)–(255,255)

B data: (0,0)–(217,228)–(255,255)

for shadow curve:

R data: (0,0)–(29,35)–(255,255)

G data: (0,0)–(16,35)–(255,255)

B data: (0,0)–(19,35)–(255,255)

for gray curve:

R data: (0,0)–(126,114)–(255,255)

G data: (0,0)–(090,114)–(255,255)

B data: (0,0)–(138,114)–(255,255).

Next, the algorithm 4 will be described below.

This algorithm is identical in the steps 201 to 208 to the algorithm 2, and different in the step 209 in which $O'_M$ is calculated by using following equation:

$$O'_M(R) = \Sigma I_M * gray\ (O_M(R)/\Sigma O_M)$$

$$O'_M(G) = \Sigma I_M * (O_M(G)/\Sigma O_M)$$

$$O'_M(B) = \Sigma I_M * (O_M(B)/\Sigma O_M)$$

Furthermore, based on the calculated $O'_M$, gray correction curve passing through (0, 0), ($I_M$, $O'_M$), (255, 255) is generated. In the step 210 the RGB digital data are respectively converted according to the gray correction curve, then in the step 211 the digital data of the image converted is stored.

Similarly, the RGB values in the chart (input values) are:

white: $I_H(R)$=208, $I_H(G)$=188, $I_H(B)$=217, black: $I_L(R)$=29, $I_L(G)$=16, $I_L(B)$=19, gray: $I_M(R)$=126, $I_M(G)$=90, $I_M(B)$=138, and the target RGB values (target values) are white: $O_H(R)$=$O_H(G)$=$O_H(B)$=228, black: $O_L(R)$=$O_L(G)$=$O_L(B)$=35, gray : $O_M(R)$=$O_M(G)$=$O_M(B)$=114, then, the correction curve will be (see FIGS. 16 to 18):

for highlight curve:

R data: (0,0)–(208,228)–(255,255)

G data: (0,0)–(188,228)–(255,255)

B data: (0,0)–(217,228)–(255,255)

for shadow curve:

R data: (0,0)–(29,35)–(255,255)

G data: (0,0)–(16,35)–(255,255)

B data: (0,0)–(19,35)–(255,255)

for gray curve:

R data: (0,0)–(126,114)–(255,255)

G data: (0,0)–(90,114)–(255,255)

B data: (0,0)–(138,114)–(255,255).

Thus the results are identical.

In the correction algorithm 2, 3, and 4, correction is performed independently in the order of white, black, gray, that is, highlight, shadow, gray. This leads a certain affection of the preceding correction in the succeeding correction. However there will be no significant effect for practical purposes.

As stated above, If in the correction algorithm 2, 3, and 4 the correction is performed in the order of highlight (white), shadow (black), then gray, white correction may be varied in accordance with the correction of its following black and gray correction, however there are so few changes in appearance that the best results of correction have been obtained.

In the correction algorithm as described above, RGB data is used as image data. However CMY data may be used instead.

Now referring to the flow chart shown in FIG. 19, correction algorithm 5 will be described below in which L* a* b* data is used for image data of color system wherein brightness (luminance) and chrominance are separated, such as L* a* b*, L* u* v*, or YIQ color system.

The target value $O_H$, $O_L$, $O_M$ for white, black, and gray respectively are preselected. In the step 301 an image is displayed. In the step 302 the L* values for white and black regions in the image, $I_H(L)$, and $I_L(L)$ respectively, and L* a* b* values for gray region $I_M(L)$, $I_M(a)$, $I_M(b)$ are captured. In the step 303 L* correction curve passing through (0, 0), $(I_L(L), O_L(L))$, $(I_M(L), O_M(L))$, $(I_H(L), O_H(L))$, (100, 100) are generated. In the step 304 the captured L* data is converted according to the correction curve. In the step 305 the correction values ΔM(a) and ΔM(b) are calculated given by:

$$\Delta M(a) = O_M(a) - I_M(a),$$
$$\Delta M(b) = O_M(b) - I_M(b).$$

In the step 306 the correction values $\Delta_M(a)$ and $\Delta_M(b)$ are added to the already captured a* and b* data. In the step 307 digital data of the converted image is stored.

Figure 20:
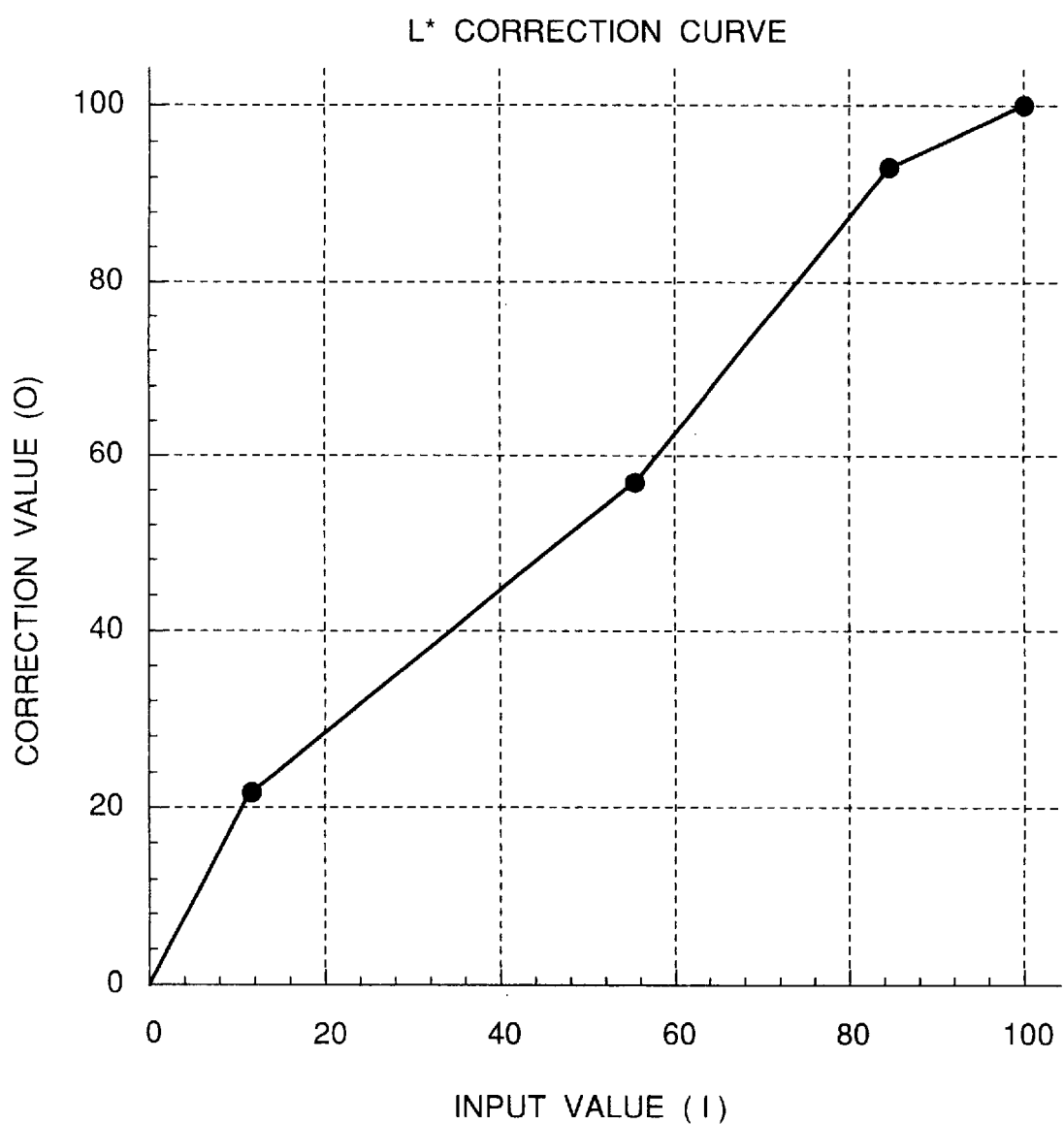
FIG. 20 A graph of the correction curve created by the algorithm shown in the flow chart shown in FIG. 19.

For example, if the L*, a*, b* values for a chart (input values) are
white: $I_H(L)=84$,
black: $I_L(L)=12$,
gray: $I_M(L)=55$, $I_M(a)=24$, $I_M(b)=-19$
and the target L* a* b* values (target values) are
white: $I_H(L)=93$,
black: $I_L(L)=22$,
gray: $I_M(L)=58$ $I_M(a)=0$, $I_M(b)=0$
then L* correction curve will be:
(0, 0), (12, 22), (55, 58), (84, 93), (100, 100),
as shown in FIG. 20. Also the correction values ΔM(a) and ΔM(b) will be:
ΔM(a)=0−24=−24,
ΔM(b)=0−(−19)=19.

In the correction algorithm 5 described above, an example of image data with L* a* b* are cited. However this may be image data of any color systems which separate brightness (luminance) with chrominance, such as L* u* v* or YIQ color system.

In the correction algorithm 1 to 5 white, black, and gray regions are all used for correct coloring, since these three colors are most effective for correction of incomplete color due to under exposure at the time of taking picture or fog.

For example, it is often difficult to determine which region in a taken image should be treated as highlight or shadow. With an image taken with the color chart for image correction, it is obvious that the white portion of the color chart is a highlight point, and that the black portion of the color chart is a shadow point.

For correction of fog, it may be necessary to find an uncolored zone within an image. As the white, black, and gray regions are all uncolored, these regions are highly advantageous for the correction of fog.

In the correction algorithms cited above, white, black, and gray regions within an image are used for color correction. The present invention is intended not to be limited thereby. Also, the present invention may use the colorings. In addition, the order of correction is not limited to that described above, in accordance with the present invention.

In the correction method of colors according to the present invention described above, a correction curve is generated for each image displayed on a display for the correction of color values. However a same correction curve may be used for a plurality of images with the identical condition.

Figure 19:
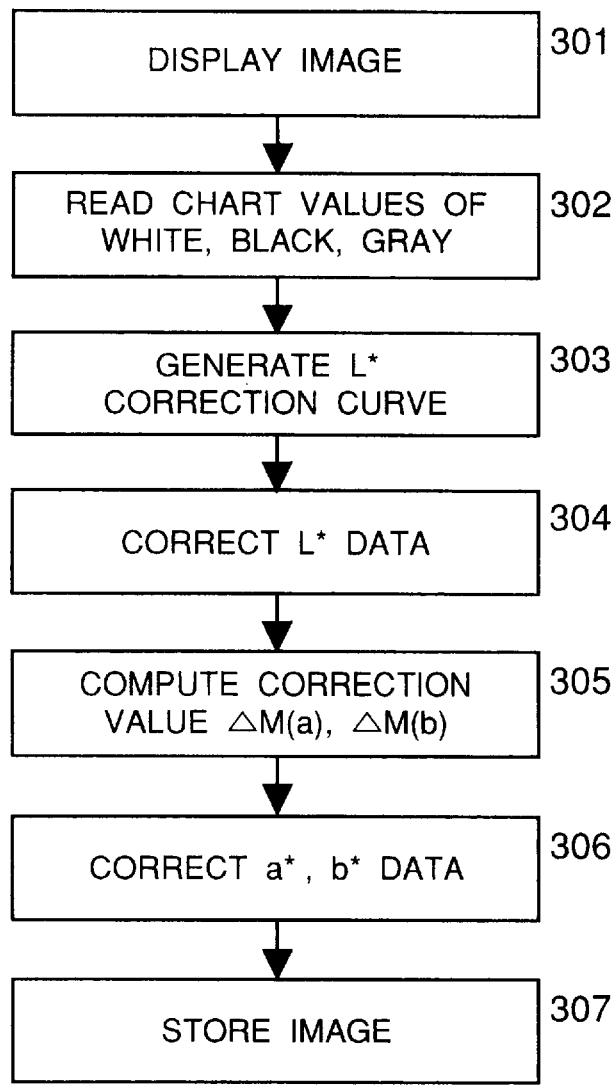
FIG. 19 A flow chart of another correction algorithm of the color correction method according to the present invention.

Accordingly, in this case, by using the correction curve generated and stored in the first operation of color correction for all of subsequent images, the steps of generating correction curves in the flow chart in FIG. 12, FIG. 15, and FIG. 19 are omitted in order to speed up the process of color correction.

We claim:

1. A color chart for image correction comprised of a sheet base substrate such as paper and plastic film, in which an adhesive layer is provided in the posterior side for adhering onto an object the surface of the sheet base substrate is matted, and at least three mat color materials are applied each in a different partition on the surface of the sheet base substrate, wherein the partitions to which said color materials are applied is divided into square grids of the same number as the number of the color materials a scale is provided located around the square grid partitions on the surface of said base substrate in a form of a series of squares of a standard size.

2. The color chart for image correction as in claim 1, comprising fundamental color of at least one color system from RGB color system, CMY color system, and Lab color system in the color materials.

3. The color chart for image correction as in claim 1, further comprising at least one of white, gray, and black in the color materials.

4. The color chart for image correction as in claim 1, wherein the surface of said base substrate is formed in the form of square, an inscribed circle approximately inscribing to said square thereon is formed, and said circle is divided into quadratures, and one of zone of said quadratures of the circle and zone of the four corners of the squares outside the circle is applied with colors of three primary colors of RGB color system, three primary colors of CMY color system, fundamental colors of Lab color system, and the other is applied with at least one of white, gray, and black color materials.

5. The color chart for image correction as in claim 4, the entire square surface of the base substrate is partitioned as grids and a part of the grid is superimposed on the quadrature lines of said circle.

6. The color chart for image correction as in claim 4, at least one of quadrature circle within said circle on the surface of said base substrate is partitioned as grids and a part of the grid is superimposed on the quadrature lines of said circle.

7. The color chart for image correction as in claim 1, wherein the length of one edge of respective partitions of said grids is a standard size.

8. The color chart for image correction as in claim 1, wherein said surface of said base substrate is formed of material having roughness and color approximately identical to the surface of said object.

9. The color chart for image correction as in claim 1, wherein said surface of said base substrate is formed of material having roughness and color approximately identical to the human skin.

10. A method of color correction comprising the steps of:
recording images of a color chart for image correction comprised of a sheet base substrate such as paper and plastic film, in which an adhesive layer is provided in the posterior side for adhering onto an object, the surface of the base is matted, and at least three mat color materials are applied each in a different partition on the surface of the base substrate, along with the object by adhering thereon with said adhesive layer;
capturing said taken image into a storage device as digital data;

displaying on a display screen the digital data stored in the storage device;

reading the color values of at least two of said three colors of the color chart for image correction on the display;

computing a correcting value for each color based on the digital data of the color values of the read color chart for image correction and target values corresponding to the partitions in the color chart for image correction, and;

correcting the digital data stored in the storage device with said computed correction values to store again in the storage device.

11. The method of color correction as in claim 10, wherein said three colors are predetermined to be white, black, and gray, and the target values for these color values $O_H$, $O_L$, $O_M$ are preselected, and wherein from the image displayed on said display RGB values for white partition $I_H(R)$, $I_H(G)$, $I_H(B)$, RGB values for black partition $I_L(R)$, $I_L(G)$, $I_L(B)$, and RGB values for gray partition $I_M(R)$, $I_M(G)$, $I_M(B)$ are read to compute correction values on a bi-dimensional graph having the read values and said corresponding target values as coordinate axis according to a curve passing through (0, 0), $(I_L, O_L)$, $(I_M, O_M)$, $(I_H, O_H)$, (255, 255).

12. The method of color correction as in claim 10, wherein said three colors are predetermined to be white, black, and gray, and the target values for these color values $O_H$, $O_L$, $O_M$ are preselected;

wherein from the image displayed on said display RGB values for white partition $I_H(R)$, $I_H(G)$, $I_H(B)$, are read to convert respective RGB digital data on a bi-dimensional graph having the read values and said corresponding target values as coordinate axis according to a curve passing through (0, 0), $(I_H, O_H)$, (255, 255);

wherein from the image displayed on said display RGB values for black partition $I_L(R)$, $I_L(G)$, $I_L(B)$, are read to convert respective converted RGB digital data on a bi-dimensional graph having the read values and said corresponding target values as coordinate axis according to a curve passing through (0, 0), $(I_L, O_L)$, (255, 255); and wherein from the image displayed on said display RGB values for gray partition $I_M(R)$, $I_M(G)$, $I_M(B)$, are read to convert respective converted RGB digital data on a bi-dimensional graph having the read values and said corresponding target values as coordinate axis according to a curve passing through (0, 0), $(I_M, O_M)$, (255, 255).

13. The method of color correction as in claim 10, wherein said three colors are predetermined to be white, black, and gray, and the target values for white and black color values $O_H$, $O_L$ are preselected;

wherein from the image displayed on said display RGB values for white partition $I_H(R)$, $I_H(G)$, $I_H(B)$, are read to convert respective RGB digital data on a bi-dimensional graph having the read values and said corresponding target values as coordinate axis according to a curve passing through (0, 0), $(I_H, O_H)$, (255, 255);

wherein from the image displayed on said display RGB values for black partition $I_L(R)$, $I_L(G)$, $I_L(B)$, are read to convert respective converted RGB digital data on a bi-dimensional graph having the read values and said corresponding target values as coordinate axis according to a curve passing through (0, 0), $(I_L, O_L)$, (255, 255); and wherein from the image displayed on said display RGB values for gray partition $I_M(R)$, $I_M(G)$, $I_M(B)$, are read to compute the mean value $Ave(I_M)$ thereof to convert respective converted RGB digital data on a bi-dimensional graph having the read values and said corresponding target values as coordinate axis according to a curve passing through (0, 0), $(I_M, Ave(I_M))$, (255, 255).

14. The method of color correction as in claim 10, wherein said three colors are predetermined to be white, black, and gray, and the target values for these color values $O_H$, $O_L$, $O_M$ are preselected;

wherein from the image displayed on said display RGB values for white partition $I_H(R)$, $I_H(G)$, $I_H(B)$, are read to convert respective RGB digital data on a bi-dimensional graph having the read values and said corresponding target values as coordinate axis according to a curve passing through (0, 0), $(I_H, O_H)$, (255, 255);

wherein from the image displayed on said display RGB values for black partition $I_L(R)$, $I_L(G)$, $I_L(B)$, are read to convert respective converted RGB digital data on a bi-dimensional graph having the read values and said corresponding target values as coordinate axis according to a curve passing through (0, 0), $(I_L, O_L)$, (255, 255); and wherein RGB values of the gray partition $I_M(R)$, $I_M(G)$, $I_M(B)$ are read to compute $O'_M$ given by $$O'_M(R) = \Sigma I_M + (O_M(R)/\Sigma O_M)$$

$$O'_M(G) = \Sigma I_M + (O_M(G)/\Sigma O_M)$$

$$O'_M(B) = \Sigma I_M + (O_M(B)/\Sigma O_M)$$

where $\Sigma I_M = I_M(R) + I_M(G) + I_M(B)$, $\Sigma O_M = O_M(R) + O_M(G) + O_M(B)$, to convert respective converted RGB digital data on a bi-dimensional graph having the read values and said corresponding target values as coordinate axis according to a curve passing through (0, 0), $(I_M, O'_M)$, (255, 255).

15. The method of color correction as in claim 10, wherein said three colors are predetermined to be white, black, and gray, and the target values for these color values $O_H$, $O_L$, $O_M$ are preselected;

wherein L* part of the grid is value for white and black partitions of the image opened on said display, $I_H(L)$, $I_L(L)$, and L* a* b* values for gray partition $I_M(L)$, $I_M(a)$, $I_M(b)$ are read to convert said read L* data according to a curve passing through the points (0, 0), $(I_L(L), O_L(L))$, $(I_M(L), O_M(L))$, $(I_H(L), O_H(L))$, (100, 100) on the bi-dimensional graph having these read values and the corresponding target values as coordinate axis;

wherein the correction values $\Delta M(a)$, $\Delta M(b)$ are calculated given by:

$$\Delta M(a) = O_M(a) - I_M(a), \text{ and}$$

$$\Delta M(b) = O_M(b) - I_M(b),$$

wherein said converted digital data is converted by adding said correction values $\Delta M(a)$, $\Delta M(b)$ to the already captured a* and b* data respectively.

* * * * *